United States Patent
Eskilsson et al.

(10) Patent No.: US 9,290,393 B2
(45) Date of Patent: Mar. 22, 2016

(54) PROCESSES FOR MAKING HIGH IRON CONTENT STABLE FERRIC CHLORIDE SOLUTIONS

(75) Inventors: Krister Eskilsson, Landskrona (SE);
Stig Gunnarsson, Heisingbord (SE);
Jeffrey Campbell, Lakeland, FL (US);
Jan Pavlicek, Detroit, MI (US);
Faziollah Azarnoush, Helsinki (FI);
Esko Tirronen, Espoo (FI)

(73) Assignee: KEMIRA OYJ, Helsinki (FI)

( * ) Notice: Subject to any disclaimer, the term of this patent is extended or adjusted under 35 U.S.C. 154(b) by 56 days.

(21) Appl. No.: 13/823,267

(22) PCT Filed: Nov. 30, 2011

(86) PCT No.: PCT/US2011/062582
§ 371 (c)(1),
(2), (4) Date: Mar. 14, 2013

(87) PCT Pub. No.: WO2012/075109
PCT Pub. Date: Jun. 7, 2012

(65) Prior Publication Data
US 2013/0236379 A1    Sep. 12, 2013

Related U.S. Application Data

(60) Provisional application No. 61/417,973, filed on Nov. 30, 2010.

(51) Int. Cl.
*C01G 49/10*    (2006.01)

(52) U.S. Cl.
CPC .................................. *C01G 49/10* (2013.01)

(58) Field of Classification Search
None
See application file for complete search history.

(56) References Cited

U.S. PATENT DOCUMENTS

| 2,215,451 | A |  | 9/1940 | Beekhuis |  |
| 4,066,748 | A |  | 1/1978 | Lietard et al. |  |
| 5,250,276 | A |  | 10/1993 | Knuuttila |  |
| 5,422,091 | A |  | 6/1995 | Clair et al. |  |
| 5,455,017 | A | * | 10/1995 | Clair et al. | 423/493 |
| 8,071,067 | B2 | * | 12/2011 | Eskilsson et al. | 423/493 |

FOREIGN PATENT DOCUMENTS

| JP | 08253325 A | 10/1996 |
| WO | 2010/138443 | 12/2010 |
| WO | 2010138443 | 12/2010 |

OTHER PUBLICATIONS

European search report regarding application 11845852.0; European Patent Office, Munich Germany; 6 pages; May 12, 2014.
The International Search Report and Written Opinion dated Jun. 20, 2012.
European Patent Office Communication; Application No. 1184585. 20-1354/2646371; observations by a third party; dated May 18, 2015; 17 pages; European Patent Office, 80298, Munich, Germany.

* cited by examiner

*Primary Examiner* — Steven Bos
(74) *Attorney, Agent, or Firm* — Thomas Horstemeyer, LLP

(57) ABSTRACT

Processes for forming high iron content ferric chloride solutions, reconstituting ferric chloride solutions, and transporting the stable ferric chloride solutions with the high iron content are disclosed.

4 Claims, 1 Drawing Sheet

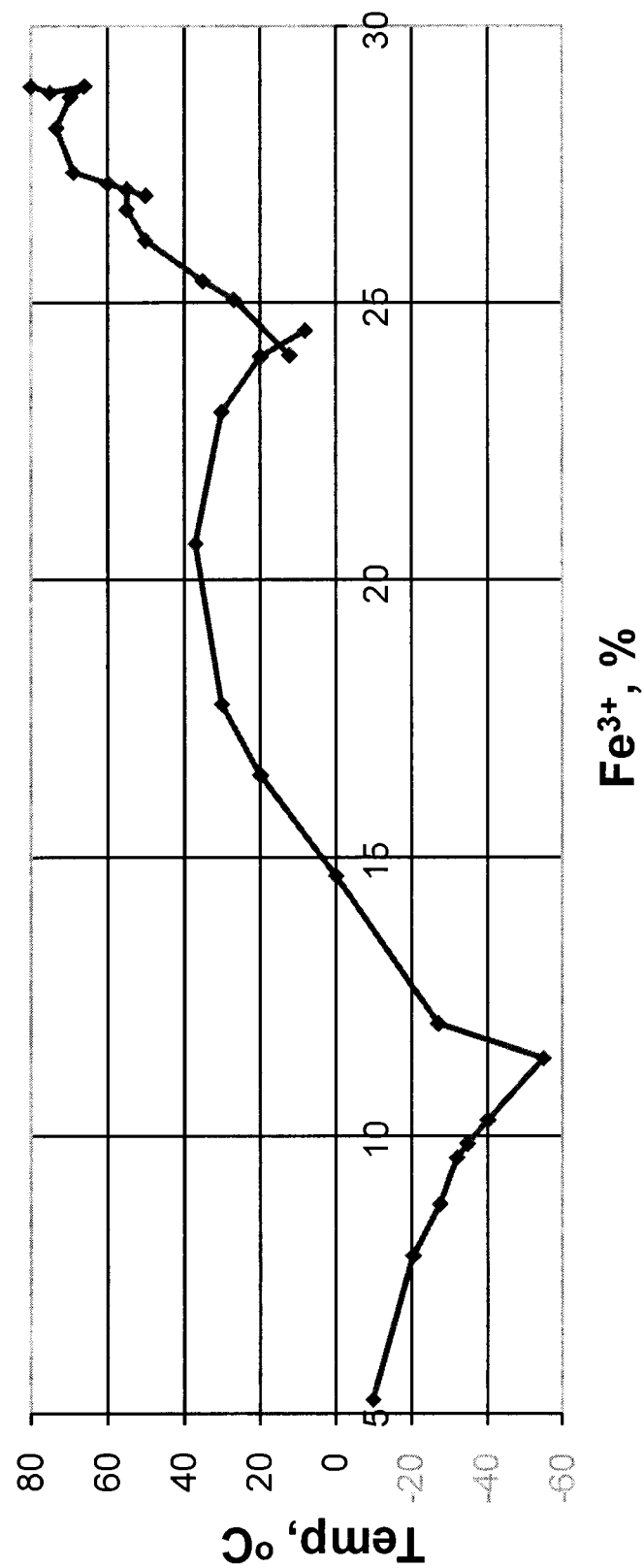

US 9,290,393 B2

PROCESSES FOR MAKING HIGH IRON CONTENT STABLE FERRIC CHLORIDE SOLUTIONS

CROSS-REFERENCE TO RELATED APPLICATION(S)

This application is the 35 U.S.C. §371 national stage of PCT application PCT/US2011/62582, filed Nov. 30, 2011 which claims priority to and the benefit of U.S. Provisional Application Ser. No. 61/417,973, filed Nov. 30, 2010, both of which are hereby incorporated by reference herein in their entirety.

BACKGROUND

Aqueous solutions of ferric chloride ($FeCl_3$) are commonly used as flocculating agents for treatment of water, for hydrogen sulfide control, struvite control, sludge conditioning, color removal, phosphate removal, heavy metal removal, lime softening applications, and the like. For water treatment applications, the trivalent iron functions exceptionally well for both potable and wastewater clarification. Solutions containing ferric chloride can be prepared in a variety of ways. For example, ferric chloride solutions can be produced by oxidation of ferrous chloride using oxygen ($O_2$) or chlorine ($Cl_2$); by dissolution of ferric oxide with hydrochloric acid; and the like. These iron solutions are typically supplied with an iron concentration of less than 15 weight percent because at higher iron concentrations, precipitation can result especially when the ferric chloride solution is subjected to relatively low temperatures of about 0° C. or less and/or are not solution stabilized with hydrochloric acid.

Many of the processes for manufacturing ferric chloride use hydrochloric acid as a reagent in the reaction. For example, the reaction of ferric oxide with hydrochloric acid to form ferric chloride can be quantified as follows:

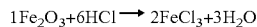

$$1Fe_2O_3 + 6HCl \rightarrow 2FeCl_3 + 3H_2O$$

The hydrochloric acid and ferric oxide react to form reaction products including ferric chloride, water, and residuals including unreacted hydrochloric acid and unreacted ferric oxide. The amount of unreacted hydrochloric acid in the product is typically on the order of a few weight percent.

In view of economies of scale, it would be desirable and a significant commercial advantage to define a process and solution composition that provides a solution with an increased iron content

BRIEF SUMMARY

In view of the foregoing, one or more embodiments include processes for producing a ferric chloride solution, processes for reconstituting an aqueous ferric chloride solution, and the like.

At least one embodiment provides a process for making a high iron content ferric chloride solution, among others, that includes: evaporating water from a ferric chloride solution having an iron content of about 15 weight percent or less to increase the iron content to about 23 to 26 weight percent.

At least one embodiment provides a process for producing a ferric chloride solution with high iron content, among others, that includes: oxidizing a hydrochloric acid containing iron containing spent pickling liquor to form a ferric chloride solution having an iron content of about 15 weight percent or less; and evaporating water and the free hydrochloric acid from the ferric chloride solution to increase the iron content to about 23 to 26 weight percent.

At least one embodiment provides a process for reconstituting an aqueous ferric chloride solution having an iron content of about 23 to 26 weight percent, among others, that includes: diluting a ferric chloride solution having an iron content of about 23 to 26 weight percent with water to a lower iron content (e.g., to a lower iron content than about 23 to 26 weight percent (e.g., about 20, 18, 15, 13, 12, 10, 8, 7, 5 or 3 weight percent)).

BRIEF DESCRIPTION OF THE DRAWINGS

FIG. 1 graphically illustrates iron content solubility as a function of temperature for ferric chloride solutions.

DETAILED DESCRIPTION

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, inorganic chemistry, and the like, which are within the skill of the art. Such techniques are explained fully in the literature.

The examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms and phrases that shall be defined to have the following meanings unless a contrary intention is apparent.

Discussion

In various exemplary embodiments described herein, one or more embodiments include processes for producing a ferric chloride solution, processes for reconstituting an aqueous ferric chloride solution, and the like. It is desirable to maximize the amount of trivalent iron content available in ferric chloride solutions and provide high iron content ferric chloride solutions that are stable during transportation from one location to another location and/or can be easily reconstituted on-site, e.g., after transportation. Accordingly, it would be desirable and a significant commercial advantage to define a process and solution composition that provides a stable ferric chloride solution with increased iron content, which various exemplary embodiments described herein provide such a process and solution composition.

In the exemplary embodiments described herein, ferric chloride solutions having an iron content of about 23 to about 26 weight percent can be formed. In an embodiment, the ferric chloride solution is stable during transportation and can be reconstituted on-site to the desired iron concentration as will be discussed in greater detail herein. In an embodiment, forming the ferric chloride solution with the high iron content generally includes an evaporation process at an elevated temperature. The ferric chloride solution with the high iron content can be transported once formed as a warm solution or can be heated in an amount effective to maintain the ferric chloride solution as a solution. If the temperature drops below a certain temperature, the ferric chloride solution with the high iron content can freeze, which is generally undesirable for most applications. However, in the event that the ferric chloride solution does freeze, it was discovered that there is no deleterious change in the ferric chloride composition solution upon freezing between the liquid phase and the solid phase. Hence, the material freezes as a single phase.

In one exemplary embodiment, the ferric chloride solution with the high iron content can transported as a solution by maintaining the solution temperature at about 8° C. or more (e.g., to about 80° C. or to about 100° C.). In other embodiments the temperature can be about 30° C. or more (e.g., to about 80° C. or to about 100° C.); and in still other embodiments, the temperature can be about 50° C. or more (e.g., to about 80° C. or to about 100° C.). The maximum transportation temperature is generally not limited since the ferric chloride solutions are transported in a closed container such as an insulated railroad car. In most embodiments, the temperature can be about 100° C. or less (e.g., to about 8° C., to about 30° C., to about 50° C.), and in still other embodiments, the transportation temperature can be about 75° C. or less (e.g., to about 8° C., to about 30° C., to about 50° C.). For frozen ferric chloride solutions, heat can be applied to facilitate the solid to liquid phase change. Once transported to the desired location, the ferric chloride solution having the high iron content can then be reconstituted on-site to the desired iron concentration as will be discussed in greater detail herein. As mentioned herein, the ferric chloride solution is a single phase when frozen.

Most prior art processes for making the ferric chloride solutions produce a product having an iron content of about 15 weight percent or less (e.g., about 5 weight percent, about 2 weight percent, or about 1 weight percent). The process for making the high iron content ferric chloride solution in accordance with the present disclosure can include increasing the iron content in these prior art ferric chloride solutions or may be integrated into a process flow for making the ferric chloride solution with the high iron content.

In one exemplary embodiment the process for making the high iron content ferric chloride solution includes evaporating a ferric chloride solution having about 15 weight percent iron or less (e.g., about 5 weight percent, about 2 weight percent, or about 1 weight percent) in an amount effective to increase the iron content to about 23 weight percent to about 26 weight percent. In other embodiments, the iron content can be increased to about 24.0 to about 25.0 weight percent, and in still other embodiments, the iron content can be increased to about 24.5 weight percent. As shown in FIG. 1, the concentration range is at about a local minimum in the solubility/temperature curve for ferric chloride. When the ferric chloride solution is at a concentration of about 24.5 weight percent iron, the ferric chloride solution can be maintained as a solution at temperatures of about 8° C. or more.

In regard to an exemplary embodiment of the present disclosure, evaporation increases the iron content as noted above and, if present, can concomitantly remove a significant portion of the hydrochloric acid such that the free hydrochloric acid in the ferric chloride solution is substantially zero (e.g., about 1 weight percent or less, about 0.1 weight percent or less, about 0.01 weight percent or less, or 0 weight percent). In other embodiments, the hydrochloric acid, if present, is reduced to about 0.05 weight percent or less (e.g., about 0.01, 0.001, or 0 weight percent) after evaporation The resulting ferric chloride solution has a high iron content with substantially no hydrochloric acid and can be readily reconstituted on-site (e.g., after transportation).

In another embodiment, the ferric chloride solution having the high iron content is produced by oxidizing a ferrous chloride solution such a ferrous chloride containing spent pickling liquor. Pickling liquor is often used to remove iron oxide scale from steel and the like. In an exemplary embodiment, the pickling liquor includes an iron content of about 11 to 13 weight percent and a free HCl content on the order of about 3 weight percent or less (e.g., about 0.01, 0.001, or 0 weight percent). Once the ferrous chloride therein is oxidized to ferric chloride, the resulting ferric chloride solution can be evaporated to increase the iron content to about 23 to about 26 weight percent. In an embodiment, oxidation of the ferrous ions can be affected by reaction with an oxidizing agent such as oxygen, $Cl_2$, $NaClO_3$, air, and the like.

In an exemplary embodiment, solid iron containing materials are mixed with hydrochloric acid to form a ferric chloride solution. The solid iron containing materials may be ferric and/or ferrous materials. Dissolution of the solid iron material is exothermic. Suitable solid iron materials include, without limitation, iron, scrap iron, iron ore (e.g., hematite, magnetite, limonite, and the like), all industrial formed iron oxides, and the like. Optionally, instead of a solid iron containing material, spent pickling liquors and/or pickling sludge can be used that contain high amounts of iron, and the like. In an embodiment, the spent pickling liquors may include ferrous salts, ferric salts, or mixtures thereof, wherein the ferrous salts are oxidized to form ferric salts. The ferric chloride solution prepared in this manner generally has an iron content of about 15 weight percent or less (e.g., about 0.01, 0.001, or 0 weight percent), which is then evaporated to further increase the iron content to about 23 to about 26 weight percent.

In another embodiment, solid ferrous containing materials are mixed with liquid HCl. In an embodiment, the ferrous ions are subsequently oxidized to ferric ions so as to provide a ferric chloride solution having an iron content less than (e.g., about 1 weight percent, 5 weight percent, 8 weight percent, 10 weight percent, or 12 weight percent, or more) about 15 weight percent. The ferric chloride solution can then be evaporated to increase the iron content to about 23 to about 26 weight percent.

It should be noted that the starting solution can contain a mixture of ferrous and ferric ions, if desired. If ferrous ($Fe^{2+}$) ions are present, the process may further include oxidation with oxygen to increase the oxidation state of the $Fe^{2+}$ to $Fe^{3+}$. For example, typically, a temperature of about 70° C. to 80° C. and a pressure of about 6 bars are needed to start oxidation with $O_2$, which is then increased to 120° C. to complete oxidation. With regard to magnetite solid iron materials, dissolution can result in ferrous chloride precipitation, which can be removed by filtration and processed as noted above to form the ferric chloride solutions, which can then be subjected to evaporation to further increase the iron content to about 23 to about 26 weight percent.

In an embodiment, the evaporation process can occur by distillation and/or evaporation in a continuous or batch mode. The temperature at which evaporation occurs will generally depend on the prevailing pressure and concentration of the ferric chloride solution, e.g., when the iron concentration is at about 24.5 weight percent and the prevailing pressure is at 100 mBar pressure, the evaporation temperature is 91° C. In this regard, the pressure and/or temperature can be modified accordingly.

Advantageously, the stable ferric chloride solutions with the increased iron concentration can be made available "as is" to end users or reconstituted as discussed herein to a desired iron content with minimal free HCl concentration. The high concentration of iron in the ferric chloride solutions may lead to overall lower logistics and production costs.

In an embodiment, reconstitution can include diluting the ferric chloride solution with water. Optionally, reconstitution can include the addition of hydrochloric acid. The optional hydrochloric acid in the reconstituted ferric chloride, whether present prior to reconstitution or during reconstitution solution, is about 0.05 weight percent or more (e.g., to about 0.1 weight percent, about 0.15 weight percent, about 0.5 weight percent, or about 1 weight percent) in some embodiments. In other embodiments, the hydrochloric acid content in the reconstituted ferric chloride solution is about 0.1 weight percent or more, and in still other embodiments, the hydrochloric acid content in the reconstituted ferric chloride solution is about 0.15 weight percent or more. For example, the ferric chloride solution with the high iron content can be diluted with water and hydrochloric acid added in an amount effective to provide the ferric chloride solution with an iron content of about 10 to about 14 weight percent and a final free hydrochloric acid of about 0.05 weight percent or more.

Now having described the embodiments, in general, the examples describe some additional embodiments. While embodiments are described in connection with the examples and the corresponding text and figures, there is no intent to limit embodiments of the disclosure to these descriptions. On the contrary, the intent is to cover all alternatives, modifications, and equivalents included within the spirit and scope of exemplary embodiments.

Example 1

23.7 kg of ferric chloride solution with 13.2 wt % Fe and 0.4 wt % of free HCl was charged to circulation evaporator equipped with heater, condenser and distillate receiving vessel. Evaporator pressure was set to 100 mbar(a) and evaporation was started. Fresh solution was continuously fed to the evaporator and a distillate was removed. When totally 37.3 kg of solution had been fed (15.78 kg of distillate removed), feed was stopped. Evaporation was continued batch-wise until totally 17.4 kg distillate had been removed and reboiler temperature reached 91-92° C. at 100 mba(a), vapor temperature was 51.1° C. The concentrated ferric chloride solution contained 24.5 w % Fe as analyzed by ICP method.

Example 2

In this example, a ferric chloride solution having 24.5 weight percent iron content was reconstituted. 75 g of water and 2.5 g of HCl (37% w/w) were added to 100 g of the ferric chloride solution. The dilution was exothermic and increased the solution temperature to 58° C. The final concentration of the ferric chloride solution was 13.7 weight percent iron and 0.15 percent free acidity (HCl).

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are merely set forth for a clear understanding of the principles of this disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

What is claimed is:

1. A process for making a high iron content ferric chloride solution, comprising:

oxidizing a hydrochloric acid and iron containing pickling liquor to form a ferric chloride solution having an iron content of about 15 weight percent or less;

evaporating water and free hydrochloric acid from the ferric chloride solution to increase the iron content to about 23 to 26 weight percent; and reconstituting the ferric chloride solution having the iron content of about 23 to 26 weight percent by diluting the ferric chloride solution having the iron content of about 23 to 26 weight percent to a desired iron content with water.

2. The process of claim 1, further comprising reconstituting the ferric chloride solution having the iron content of about 23 to 26 weight percent by diluting the ferric chloride solution having the iron content of about 23 to 26 weight percent to a desired iron content with water and hydrochloric acid.

3. The process of claim 1 wherein the iron containing pickling liquor comprises $Fe^{2+}$ and $Fe^{3+}$ ions; and oxidizing the iron containing pickling liquor is effective to oxidize the $Fe^{2+}$ ions to the $Fe^{3+}$ ions.

4. The process of claim 1, wherein evaporating the water and the free hydrochloric acid comprises evaporating the ferric chloride solution.

* * * * *